(12) United States Patent
Trinidad

(10) Patent No.: US 9,352,882 B2
(45) Date of Patent: May 31, 2016

(54) FLUID OUTLET SYSTEM

(71) Applicant: Luisito V. Trinidad, Mount Druitt (AU)

(72) Inventor: Luisito V. Trinidad, Mount Druitt (AU)

(\*) Notice: Subject to any disclaimer, the term of this patent is extended or adjusted under 35 U.S.C. 154(b) by 198 days.

(21) Appl. No.: 14/178,997

(22) Filed: Feb. 12, 2014

(65) Prior Publication Data

US 2015/0225132 A1    Aug. 13, 2015

(51) Int. Cl.
| | | |
|---|---|---|
| *B65D 39/06* | (2006.01) | |
| *F16K 15/04* | (2006.01) | |
| *B65D 47/24* | (2006.01) | |
| *B65D 47/30* | (2006.01) | |
| *B67D 1/14* | (2006.01) | |
| *B67D 3/04* | (2006.01) | |
| *F16K 15/18* | (2006.01) | |
| *B67D 7/00* | (2010.01) | |

(52) U.S. Cl.
CPC .............. *B65D 39/06* (2013.01); *B65D 47/249* (2013.01); *B65D 47/305* (2013.01); *B67D 1/1405* (2013.01); *B67D 3/043* (2013.01); *F16K 15/04* (2013.01); *B67D 7/005* (2013.01); *F16K 15/183* (2013.01); *F16K 15/188* (2013.01)

(58) Field of Classification Search
CPC .... B65D 39/06; B65D 47/249; B65D 47/305; B67D 3/00; B67D 7/005; F16K 15/04; F16K 15/183; F16K 15/188
USPC .............. 251/65, 82; 222/479, 484, 534, 536; 137/522, 523, 613, 614.12, 614.19
See application file for complete search history.

(56) References Cited

U.S. PATENT DOCUMENTS

| | | | | |
|---|---|---|---|---|
| 854,108 | A * | 5/1907 | Reynolds | F16K 1/306 137/614.19 |
| 3,874,562 | A * | 4/1975 | Hazard | B05B 11/0029 222/209 |
| 4,314,592 | A * | 2/1982 | Silvey | A01G 23/099 137/901 |
| 4,465,095 | A * | 8/1984 | Lindberg | F02M 25/028 123/25 L |
| H438 | H * | 3/1988 | Viksne | F16K 15/04 137/202 |
| 5,290,008 | A * | 3/1994 | Young | E03C 1/08 137/901 |
| 5,873,478 | A * | 2/1999 | Sullivan | A47G 19/2266 215/389 |

FOREIGN PATENT DOCUMENTS

GB              744858 A  *  2/1956   .............. F16K 15/04

\* cited by examiner

*Primary Examiner* — Kevin Murphy
*Assistant Examiner* — Richard K Durden
(74) *Attorney, Agent, or Firm* — Hershkovitz & Associates, PLLC; Abe Hershkovitz

(57) ABSTRACT

A fluid outlet system, applicable for containers of liquid substances is provided. The fluid outlet system has a circular opening, at a rear end of a cylindrical tube, having a removable metallic ball-covering that controls the flow of liquid from the container, as desired. Specifically, the fluid outlet system has a circular opening at a rear end of a cylindrical tube, wherein the circular opening is provided with a removable metallic ball-covering. The removable metallic ball-covering can be easily dislodged by a mechanical switch in order to dispense liquid, and is securely held in place by magnets on a valve seat of the circular opening, when the fluid outlet system is at a closed position, to stop liquid flow.

8 Claims, 10 Drawing Sheets

FLUID OUTLET SYSTEM

FIELD OF THE INVENTION

The present invention relates to a fluid outlet system, applicable for containers of liquid substances. The fluid outlet system comprises a circular opening, at a rear end of a cylindrical tube, having a removable metallic ball-covering that controls the flow of liquid from the container, as desired. Specifically, the present invention relates to a fluid outlet system comprising a circular opening, at a rear end of a cylindrical tube, having a removable metallic ball-covering. The removable metallic ball-covering can be easily dislodged by a mechanical switch in order to dispense liquid. The removable metallic ball-covering is securely held in place by magnets provided on a valve seat of the circular opening, in order to stop liquid flow.

BACKGROUND OF THE INVENTION

Fluid outlet systems are known in the art and are used for various purposes, such as in water taps, faucets, coolers and water jugs, among others. These outlet systems essentially allow the passage of fluid, such as water, and at the same time, seal the passage opening when passage of fluid is unwanted.

The common fluid outlet systems already in use include those having stop-valves that adjust the size of the opening of the outlet, such as the screw-down tap mechanism. Globe valves have soft rubber screwed to a valve seat in order to stop water flow and eliminate leaks.

However, globe valves require maintenance; as the rubber washer and the valve seat are subject to wear, and the seat subject to corrosion, over time. When this happens, a tight seal can no longer be achieved at the closed position, resulting to leaks.

Fluid outlet systems have been used in portable water or beverage dispensers and containers. Commonly, these dispensers and containers use spring which loses elasticity over time. For example, in U.S. Pat. No. 4,742,851, a coil spring extends into a counter-bore in the valve and is compressed between the valve and the finger button to resiliently bias the valve to the closed position. To control the flow of water or beverage, i.e., to close the faucet, the spring moves the valves rearwardly toward its original closed position. Liquid flowing out of the container is stopped as the rear seal engages the small-diameter portion of the nut.

The present invention does not use spring to control liquid flow; and thus, it does not have the same defect of wear and tear over time as conventional fluid outlet systems of portable liquid dispensers and containers, such as the subject invention of U.S. Pat. No. 4,742,851.

SUMMARY OF THE INVENTION

The present invention relates to a fluid outlet system, applicable for containers of liquid substances, among others. The fluid outlet system comprises a circular opening, at a rear end of a cylindrical tube, having a removable metallic ball-covering that controls the flow of liquid from the container, as desired. Specifically, the fluid outlet system of the present invention comprises a circular opening at a rear end of a cylindrical tube, wherein the circular opening is provided with a removable metallic ball-covering; and wherein the removable metallic ball-covering can be easily dislodged by a mechanical switch in order to dispense liquid, and is securely held in place by magnets on a valve seat of the circular opening, when the fluid outlet system is at a closed position, to stop liquid flow.

The removable metallic ball-covering mechanism enables the present fluid outlet system to have a longer utility lifespan not achievable by current dispensers that use spring, which loses elasticity over time. Less wear and tear can also be expected; as less force is needed to remove the ball, thereby less strain is applied to it.

The present fluid outlet system also uses a mechanical switch having movable rods, which easily dislodges the removable metallic ball-covering from the valve seat and allows water, beverages and other fluids to be dispensed very easily upon actuation of the mechanical switch. The mechanical switch is user-friendly especially to little kids and people having difficulty holding taps or buttons, such as finger buttons that are spring-operated. In addition, with the mechanical switch, the present fluid outlet system provides a cheap way of controlling release of water, beverages or other fluids, without the use of electronically-operated valve controllers or solenoids.

In addition, unlike water and beverage containers and dispensers at present, there is no need to partially open the lid of a container and dispenser having the fluid outlet system of the present invention to let air in and break the vacuum to make the flow of liquid continuous. The spout provided at the front end of the cylindrical tube contains an air release mechanism which air flows through the air release outlet. Furthermore, this spout is retractable and can be pushed into a retracted position for the following purposes: 1) to cover both ends of the spout from the environment, especially when not in use, making the present fluid outlet system hygienic; 2) to act as a secondary means of stopping any leaks in case the main flow control fails; and 3) to keep it from sticking out when not in use.

BRIEF DESCRIPTION OF THE DRAWINGS

The invention will be explained in conjunction with an illustrative embodiment shown in the accompanying drawing, in which.

DETAILED DESCRIPTION OF EMBODIMENTS

Figure 1:
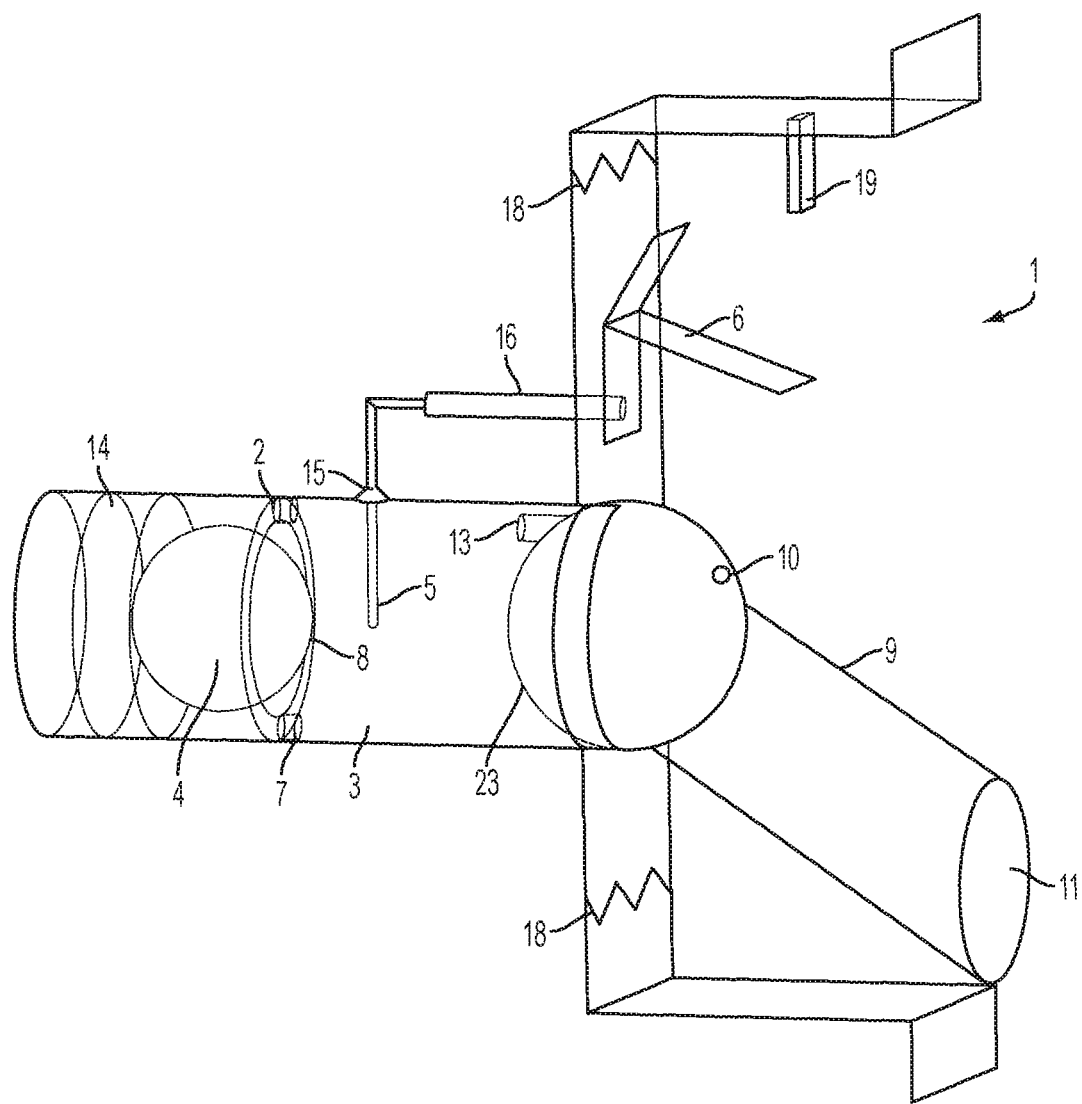
FIG. 1 is a perspective view of the fluid outlet system in accordance with the invention

Referring to FIG. 1, the present invention relates to a fluid outlet system (1) comprising a cylindrical tube (3) having, at its rear end, a circular opening (2) and provided with a removable metallic ball-covering (4). The removable metallic ball-covering (4) is securely held on the circular opening (2) of at least two magnets (7) which are arranged in opposite magnetic polarity shown in the drawings as (N) and (S). A detachable coarse screen (14) is attached longitudinally and faces toward the rear end of the cylindrical tube (3), enclosing the removable metallic ball-covering (4). A mechanical switch (6) is connected to a movable rod (5) tangentially positioned behind the removable metallic ball-covering (4), pushing and dislodging the removable metallic ball-covering (4) away from the circular opening (2) upon actuation of the mechanical switch (6).

In a second embodiment, the fluid outlet system (1) may further comprise a valve seat (8) provided on the circular opening (2) at a rear end of the cylindrical tube (3). In detail, this embodiment relates to a fluid outlet system (1) comprising a cylindrical tube (3) having, at its rear end, a circular opening (2) containing a valve seat (8), and a removable metallic ball-covering (4). The removable metallic ball-covering (4) is securely held on the valve seat (8) of at least two magnets (7) which are arranged in opposite magnetic polarity (N) and (S). A detachable coarse screen (14), attached longitudinally and facing toward the rear end of the cylindrical tube (3) encloses the removable metallic ball-covering (4). A mechanical switch (6) is connected to a movable rod (5) tangentially positioned behind the removable metallic ball-covering, pushing and dislodging the removable metallic ball-covering away from the valve seat (8) upon actuation of the mechanical switch (6).

Figure 2:
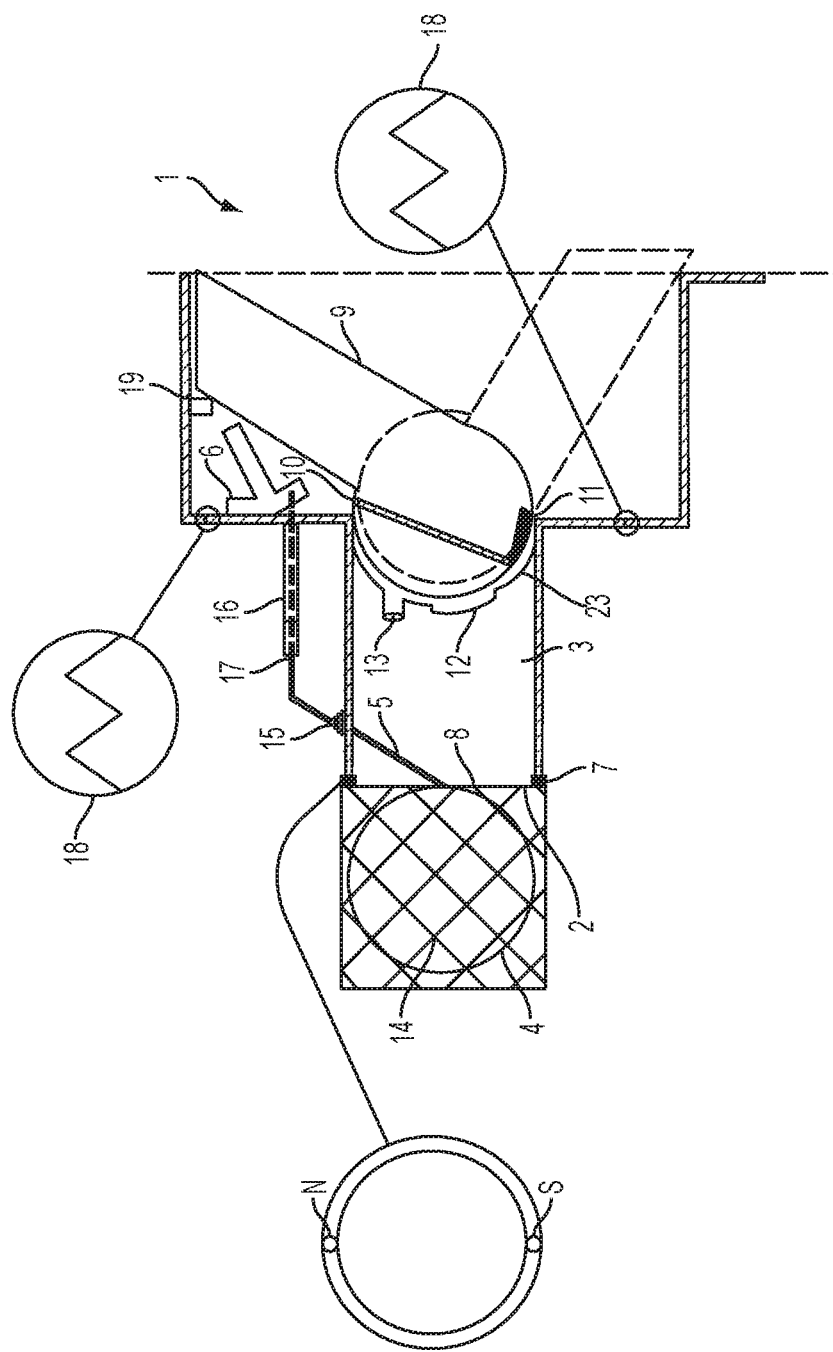
FIG. 2 is a cross-sectional view of the fluid outlet system in accordance with the invention as attached to an opening in a water or beverage container or dispenser.
Figure 3:
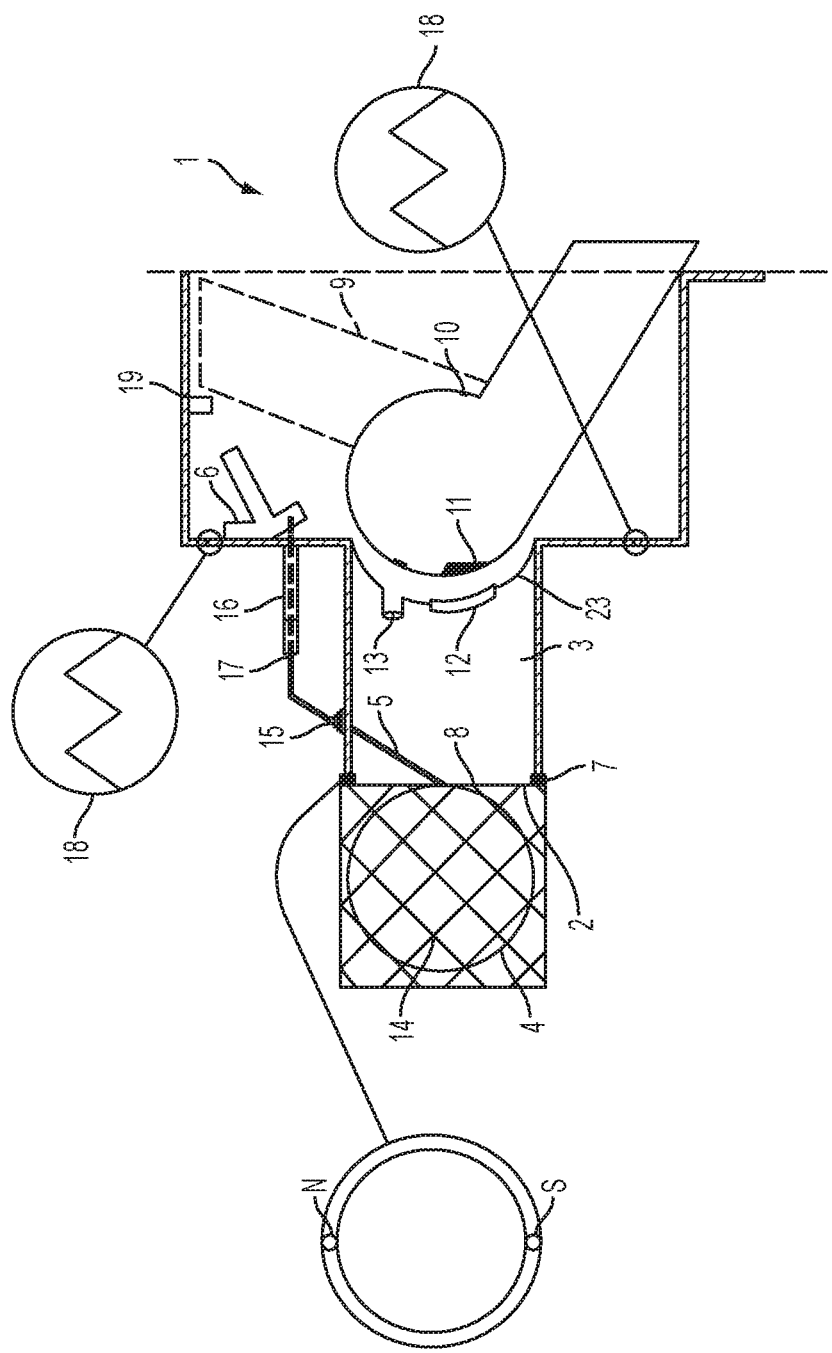
FIG. 3 is a cross-sectional view of the fluid outlet system in accordance with the invention, similar to FIG. 2, and showing the open position.
Figure 4:
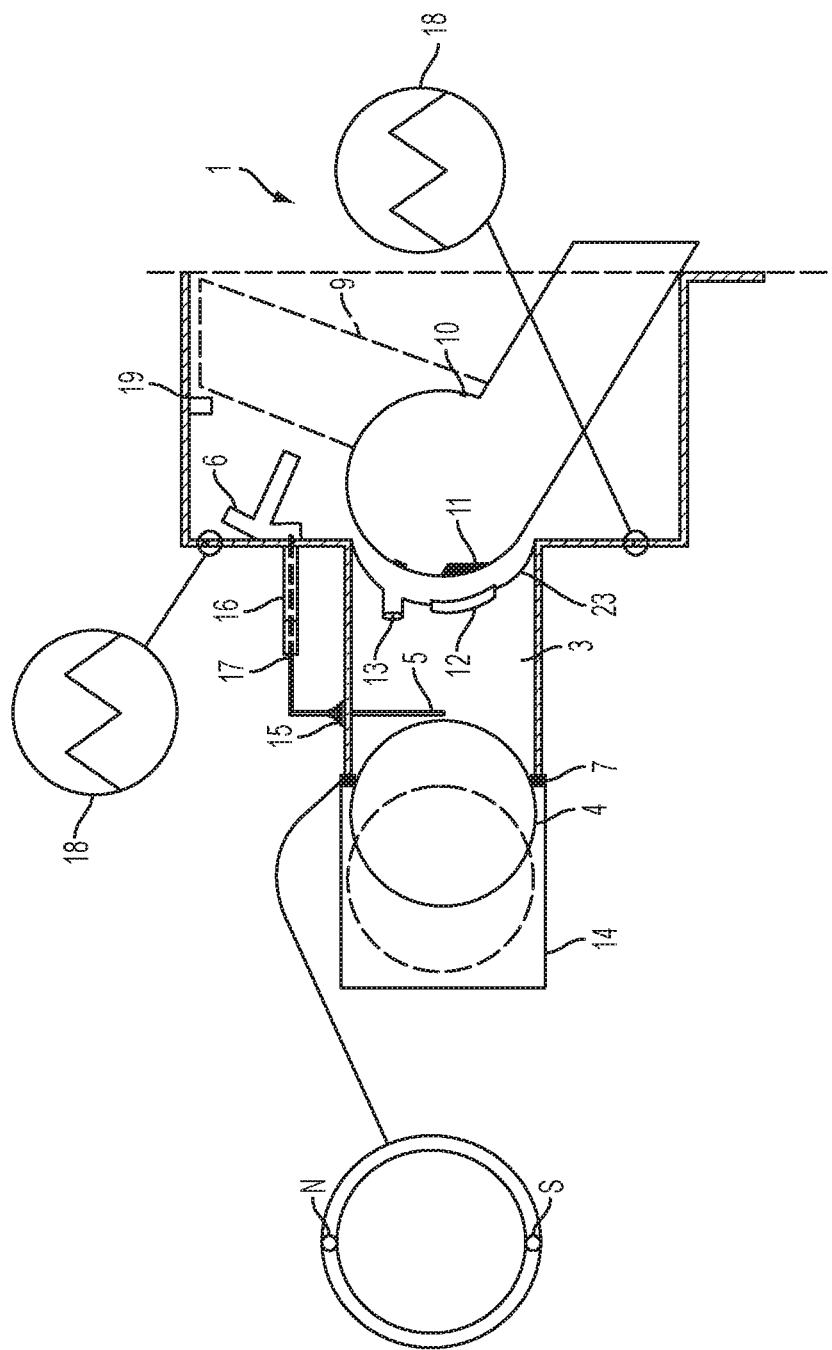
FIG. 4 is a cross-sectional view of the fluid outlet system in accordance with the invention, similar to FIG. 2, and showing the closed position.

In still another embodiment, the present fluid outlet system (1) further comprises a retractable spout (9) having an air release mechanism (10) and attached by attaching parts to the front end (23) of the cylindrical tube (3) as best seen in FIGS. 2-4.

Referring to FIGS. 1 to 4, the fluid outlet system (1) in accordance with the present invention is applicable for use with containers of liquid substances, such as water and beverage coolers and dispensers, among others. This fluid outlet system (1) comprises a cylindrical tube (3) having a circular opening (2) at its rear end, and having further a removable metallic ball-covering (4) that seals the circular opening (2) to control the flow of liquid from the container, as desired.

In a preferred embodiment of the present invention, the removable metallic ball-covering (4) of the fluid outlet system (1) of the present invention is easily dislodged by a movable rod (5) of a mechanical switch (6) in order to dispense liquid. This removable metallic ball-covering (4) is securely held on a valve seat (8) by at least two magnets (7) which are arranged in opposite polarity provided on the valve seat (8) of the circular opening (2) at a rear end of the cylindrical tube (3), in order to stop liquid from flowing. Water or liquid pressure in portable water or beverage containers or dispensers is low and is expected not to be sufficient to keep the removable metallic ball-covering (4) on the valve seat (8) and seal the circular opening (2) at a rear end of the cylindrical tube (3). Thus, the fluid outlet system (1) of the present invention is provided with a plurality of magnets (7), preferably two magnets, on the valve seat (8) of the circular opening (2) at a rear end of the cylindrical tube (3).

The removable metallic ball-covering (4) mechanism enables the present fluid outlet system (1) to have a longer utility lifespan not achievable by current dispensers that use springs, which lose elasticity over time. Less wear and tear can also be expected as less force is needed to remove the ball, thereby less strain is applied to it.

Figure 5:
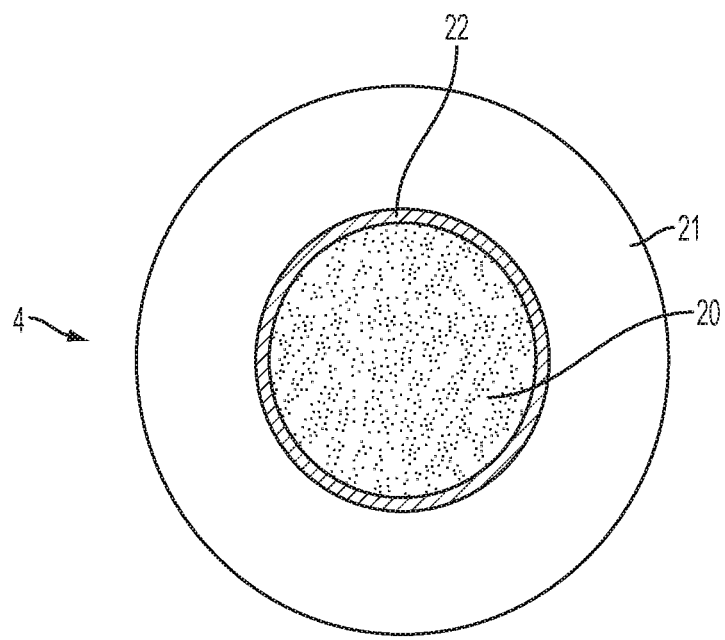
FIG. 5 is an exploded view of the metallic ball of the fluid outlet system in accordance with the invention.

It is preferred that the removable metallic ball-covering (4) be coated with plastic material to avoid rust. As shown in FIG. 5, the removable metallic ball-covering (4) has a plastic core (20), a metal coating (22) and coated with plastic material (21). The plastic material of the core and the outer coating may be the same or may vary. Any known plastic coating material for metals may be used, preferably thermoplastic coatings, such as, but not limited to polyurethane.

In addition, the removable metallic ball-covering (4) may consist wholly of metal, and may also be hollow. Any metals that are attracted to magnets may be used, preferably selected from the group consisting of iron, nickel, cobalt and magnetic alloys containing iron, nickel, cobalt and aluminum.

The removable metallic ball-covering (4), as shown in FIG. 6, is bigger in size than the circular opening (2) by 10%-15% or preferably, bigger in size by 12%. In addition, the density of the removable metallic ball-covering (4) should be higher than water, to keep the removable metallic ball-covering (4) from floating and not seating on the valve seat (8). Considering that the density of water is approximately 1.000028 g/cm3 or 1000.028 kg/m3, then the density of the removable metallic ball-covering (4) should be higher than 1.000028 g/cm3 or 1000.028 kg/m3. In order to achieve the required density of the removable metallic ball-covering (4), the amount of metal vis-à-vis the plastic material may be adjusted accordingly.

Figure 6A:
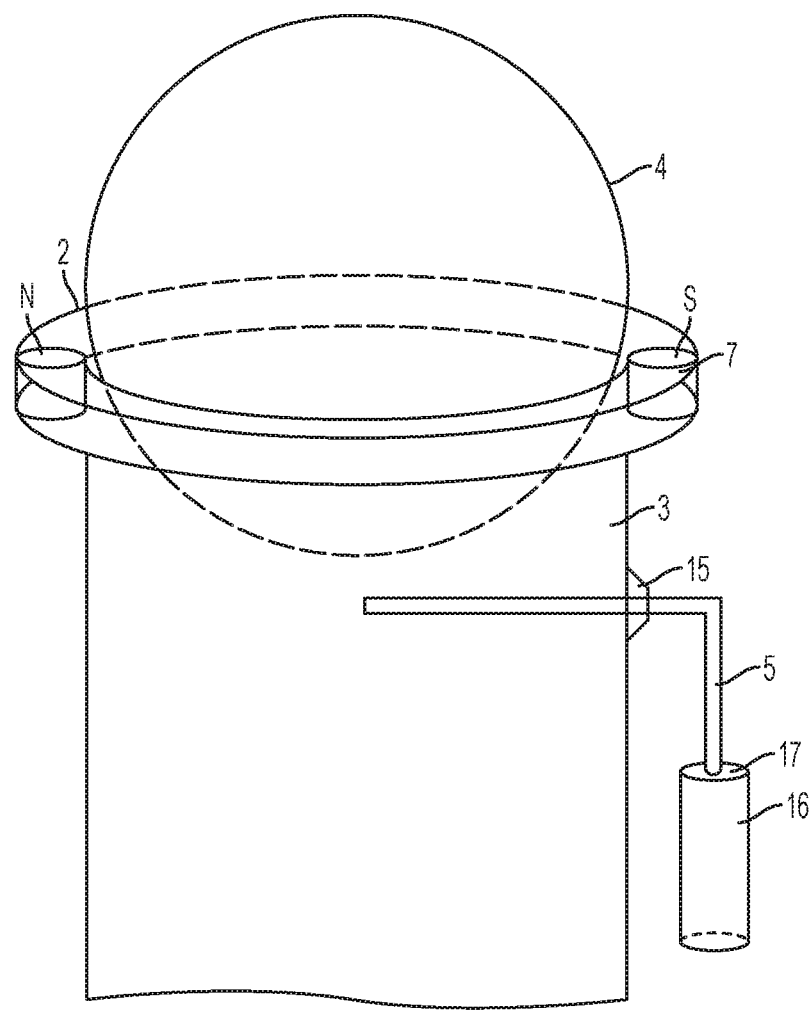
FIG. 6A is a cross-sectional view of the valve seat, of the fluid outlet system in accordance with the invention, having at least two magnets.
Figure 6B:
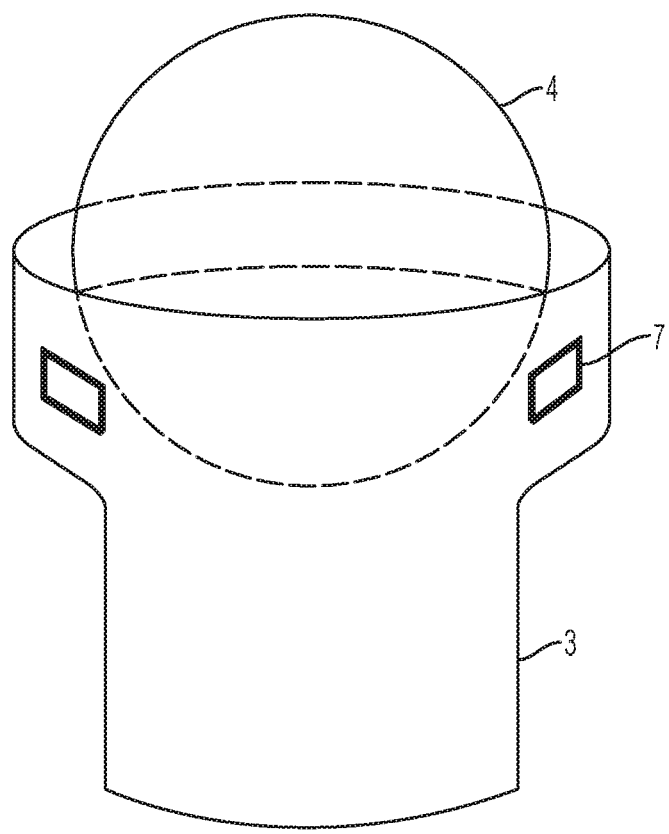
FIG. 6B is a perspective view of the valve seat, of the fluid outlet system in accordance with the invention, having at least two magnets.
Figure 7:
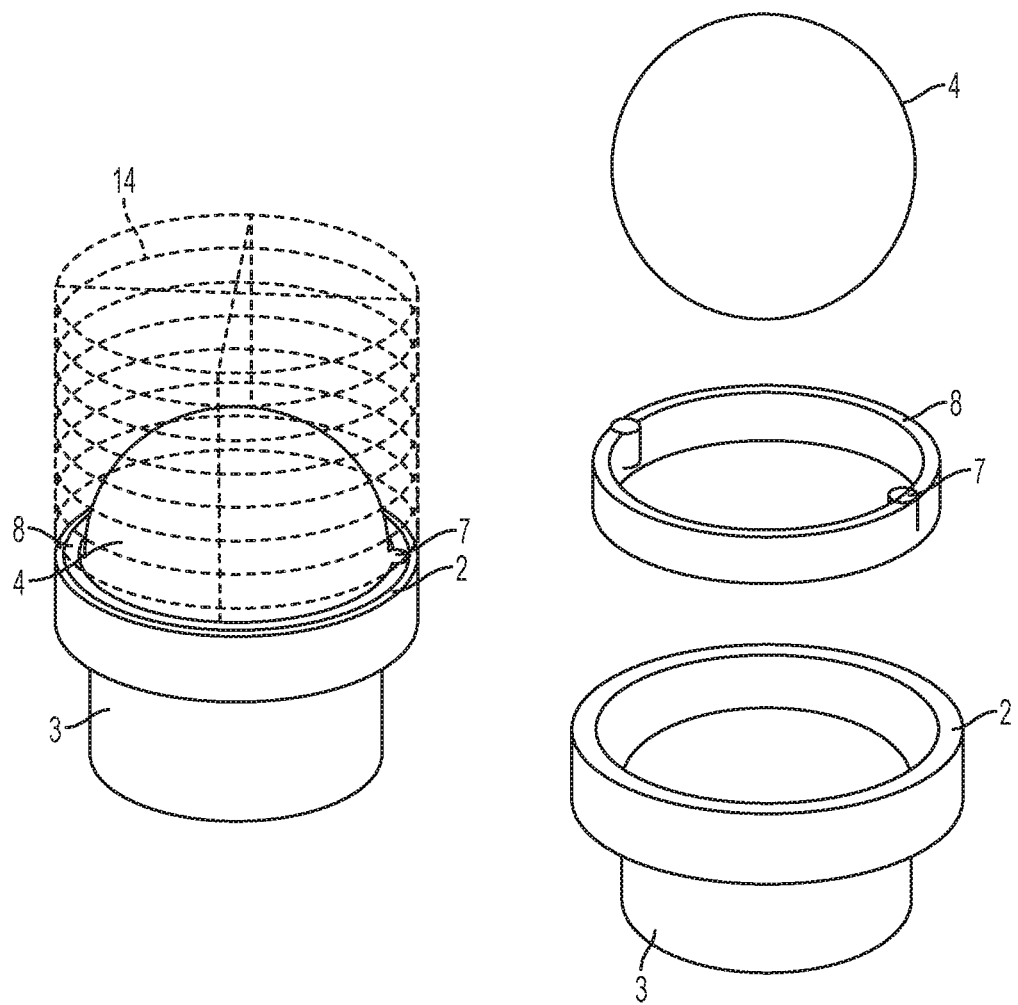
FIG. 7 is a perspective view of the rear end of the cylindrical tube of the fluid outlet system in accordance with the invention, having a valve seat provided with magnets.

FIGS. 6A, 6B and 7 illustrate how the removable metallic ball-covering (4) sits on the valve seat (8), held by the force of the magnets (7). At least two conventionally known magnets (7) may be used, and in any desired shapes or sizes.

The present fluid outlet system (1) uses a mechanical switch (6) having movable rods (5), tangentially positioned behind the removable metallic ball-covering (4) to push the removable metallic ball-covering (4) and dislodge the removable metallic ball-covering (4) from the valve seat (8) and allow water, beverages and other fluids to be dispensed very easily upon actuation of the mechanical switch (6). The mechanical switch (6) is user-friendly especially to little kids and people having difficulty holding taps or buttons, such as those which are spring-operated. In addition, with the mechanical switch (6), the present fluid outlet system (1) provides a cheap way of controlling release of water, beverages or other fluids, without use of electronically-operated valve controllers or solenoids. The rod may be made of known materials, such as hard plastics; provided that the push-force (inertia) of the movable rod (5) is more than the strength of the at-least-two conventionally known magnets (7) provided on the valve seat (8).

As shown in FIGS. 2 to 4, a movable rod (5) is connected to a mechanical switch (6) through a cylindrical tube (16) having a plurality of O-rings (17). At a closed position of the fluid outlet system (1), as illustrated in FIG. 4, the movable rod (5) does not touch the removable metallic ball-covering (4). At an open position of the fluid outlet system (1), as illustrated in FIG. 3, upon actuation of the mechanical switch (6), the movable rod (5) is pulled, thereby causing its end to touch the removable metallic ball-covering (4) at the circular opening (2) at a rear end of the cylindrical tube (3), and push the removable metallic ball-covering (4) away from the valve seat (8) on the circular opening (2) at a rear end of the cylindrical tube (3), allowing liquid to flow through the circular opening (2) through the rear end of the cylindrical tube (3), to the fluid outlet (12) and spout fluid inlet (11) of the spout (9).

Figure 8:
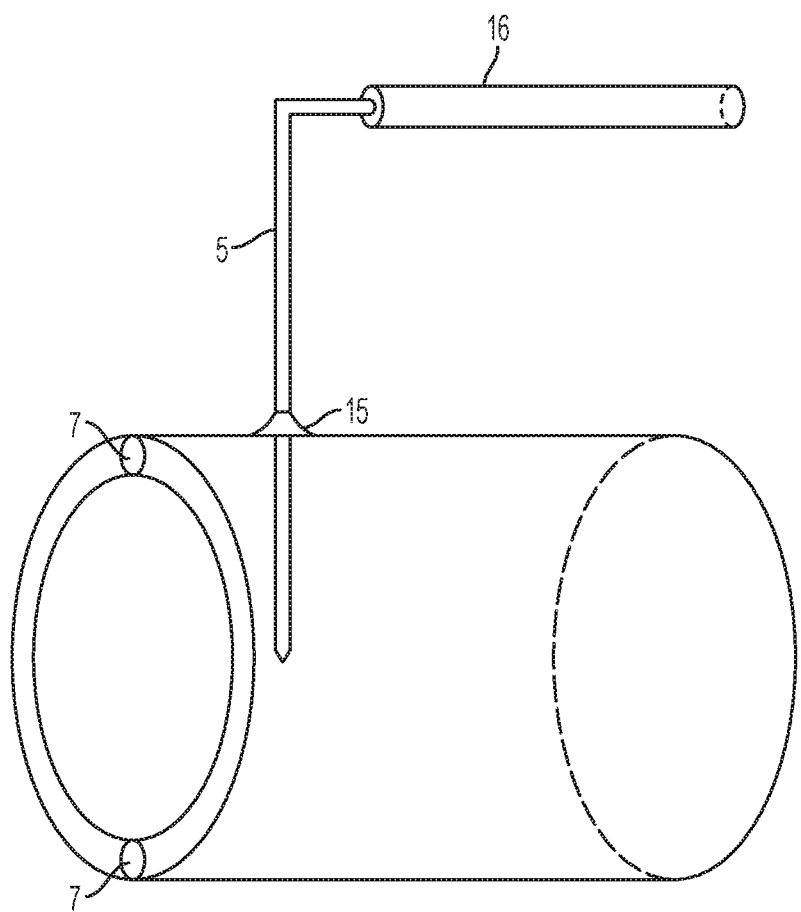
FIG. 8 is an exploded view of the rod system of the mechanical switch of the fluid outlet system in accordance with the invention.
Figure 9:
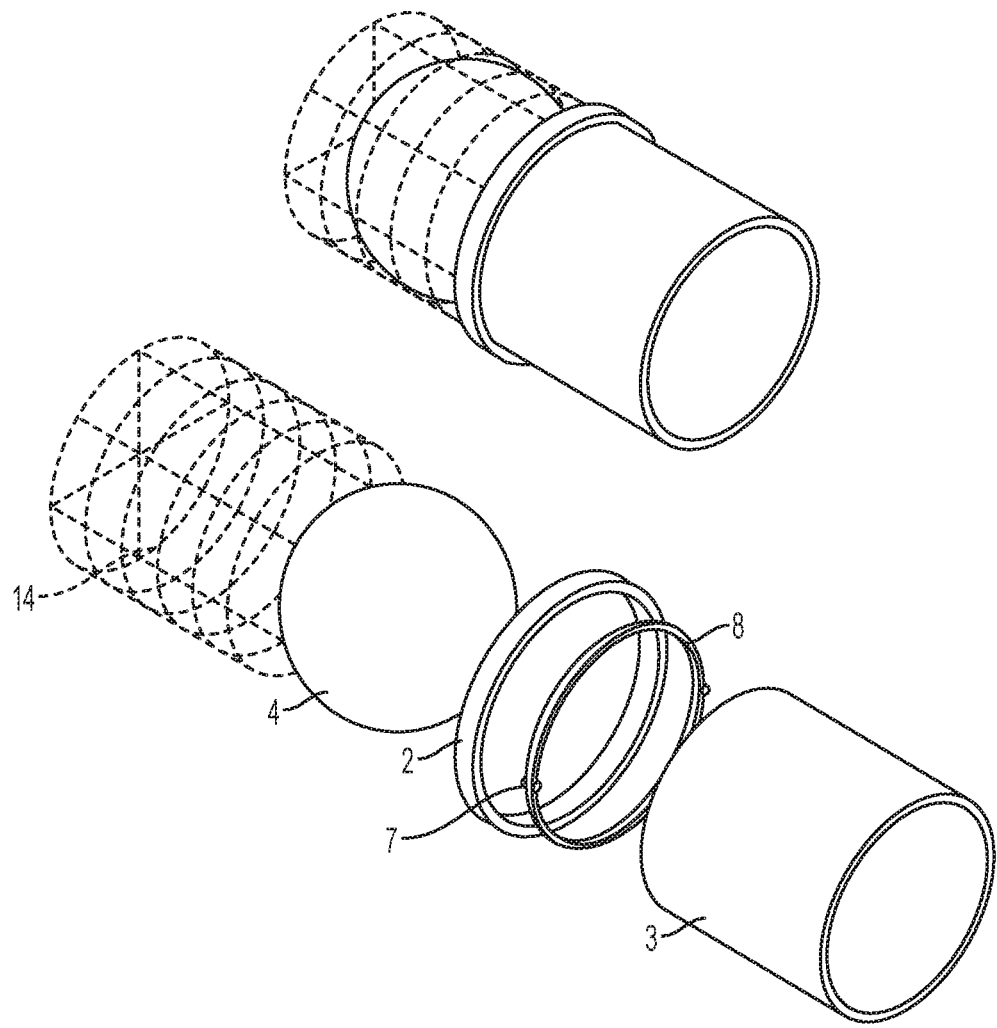
FIG. 9 is an exploded view of the rear end of the cylindrical tube of the fluid outlet system in accordance with the invention.

FIG. 8 is an exploded view of the rod system of the mechanical switch (6) of the present invention. A rubber seal (15) is provided on the cylindrical tube (3) which flexes with the movable rod (5) to allow the movable rod to move without breaking.

Unlike water and beverage containers and dispensers at present, there is no need to partially open the lid of a container and dispenser having the fluid outlet system (1) of the present invention to let air in and break the vacuum to make the flow of liquid continuous. With reference to FIGS. 2 to 4, the fluid outlet system (1) is provided at the front end of the cylindrical tube (3) with a spout (9) having an air release mechanism (10) which air flows through the air release outlet (13). This spout (9) is retractable, and hence, can be pushed back to stop leaks as explained in the first full paragraph of page 3 of the present application. In addition, leaks are controlled in the present invention; as the fluid outlet (12) provided at the front end of the cylindrical tube (3) corresponds to the size of the spout fluid inlet (11) when the spout (9) is lowered to let fluid flow from the container or dispenser through the rear end of the cylindrical tube (3). To hold the spout in place when in a closed position, as shown in FIG. 4, a stopper (19) is provided on the container or dispenser body.

Referring to FIGS. 2 to 4, the fluid outlet system (1) in accordance with the present invention is provided with a detachable coarse screen (14) attached at the rear end of the cylindrical tube (3). This detachable coarse screen (14) serves as a cage for the removable metallic ball-covering (4), catching it as it is pushed by the movable rod (5) when the mechanical switch (6) is actuated by a user. The detachable coarse screen (14) may be made of plastic or metal or any other conventional material conventionally known to be used as coarse screen.

Referring further to FIGS. 2 to 4, the fluid outlet system (1) in accordance with the present invention can be fixed on water or beverage container or dispenser by a plurality of attaching parts (18) provided above and below the fluid outlet system (1). The attaching parts (18) may be any conventional attaching parts consisting of a female and male part, wherein the female or male part is permanently fixed on the water or beverage container or dispenser and the corresponding male or female partner is fixed on the fluid outlet system (1).

With a two-liter (2L) water or beverage container, such as a water jug, water or beverage may be emptied out, if continuous flow is allowed, in approximately 35 to 40 seconds having a flow rate of approximately 0.05 to 0.06 liters per second. Flow rate increases as the size of the container, and/or the amount of liquid in the container, is increased.

While in the foregoing specification a detailed description of a specific embodiment of the invention was set forth for the purpose of illustration, it will be understood that many of the details herein given may be varied considerably by those skilled in the art without departing from the spirit and scope of the invention.

The invention claimed is:

1. A fluid outlet system comprising:
   a cylindrical tube having, at its rear end, a circular opening and provided with a removable metallic ball-covering, wherein said removable metallic ball-covering is securely held on the said circular opening by at least two magnets;
   a detachable coarse screen, attached longitudinally and facing toward the rear end of the cylindrical tube, enclosing the removable metallic ball-covering; and
   a mechanical switch connected to a rod tangentially positioned behind the removable metallic ball-covering, pushing and dislodging the said removable metallic ball-covering away from the circular opening upon actuation of the mechanical switch, wherein the removable metallic ball-covering comprises a plastic core and an outer core coated with plastic.

2. The fluid outlet system of claim 1, wherein the circular opening contains a valve seat,
   wherein said removable metallic ball-covering is securely held on the valve seat by said at least two magnets; and
   wherein the mechanical switch is pushing and dislodging the removable metallic ball-covering away from the valve seat upon actuation of the mechanical switch.

3. The fluid outlet system of claim 1, further comprising a retractable spout having an air release mechanism and attached by attaching parts to the front end of the cylindrical tube.

4. The fluid outlet system of claim, 1 wherein the removable metallic ball-covering has a density higher than the density of water.

5. The fluid outlet system of claim 1, wherein the removable metallic ball-covering has dimensions larger than the circular opening of the cylindrical tube by 10% to 15%.

6. The fluid outlet system of claim 1, wherein the rod, attached to the mechanical switch, has a push-force greater than the combined magnetic strength of the at least two magnets.

7. The fluid outlet system of claim 1, wherein the fluid outlet system is attached to a container by attaching parts.

8. The fluid outlet system of claim 2, further comprising a retractable spout having an air release mechanism and attached by attaching parts to the front end of the cylindrical tube.

* * * * *